(12) United States Patent
Meiji et al.

(10) Patent No.: US 6,391,075 B1
(45) Date of Patent: May 21, 2002

(54) PACKAGED AIR FILTER PART AND METHOD OF PACKAGING THE AIR FILTER PART

(75) Inventors: Kazuhiro Meiji; Seiichi Hirano; Osamu Inoue; Shinji Ohno, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/680,933

(22) Filed: Oct. 10, 2000

(30) Foreign Application Priority Data

Aug. 14, 2000 (JP) ........................................ 2000-245872

(51) Int. Cl.$^7$ ................................................ B01D 46/00
(52) U.S. Cl. ........................... 55/385.2; 55/521; 55/524; 55/528; 454/187
(58) Field of Search ...................... 55/385.2, 385.4, 55/497, 514, 521, 524, 528, DIG. 5, DIG. 24; 96/4, 7, 8, 9, 10, 11, 12, 13, 14; 454/187

(56) References Cited

U.S. PATENT DOCUMENTS

| | | | | |
|---|---|---|---|---|
| 5,234,751 A | * | 8/1993 | Harada et al. .............. | 264/119 |
| 5,772,884 A | * | 6/1998 | Tanaka et al. ......... | 210/500.36 |
| 5,997,598 A | * | 12/1999 | Kobayashi et al. ............ | 55/524 |
| 6,106,586 A | * | 8/2000 | Kobayashi et al. ............ | 55/524 |
| 6,149,702 A | * | 11/2000 | Kawano et al. ................ | 55/528 |
| 6,155,922 A | * | 12/2000 | Kobayashi et al. ......... | 454/187 |
| 6,269,681 B1 | * | 8/2001 | Hara et al. ..................... | 55/479 |
| 6,293,982 B1 | * | 9/2001 | Kobayashi et al. ........ | 55/385.2 |

\* cited by examiner

Primary Examiner—David A. Simmons
Assistant Examiner—Minh-Chau T. Pham
(74) Attorney, Agent, or Firm—Shinjyu Global IP Counselors, LLP

(57) ABSTRACT

A packaged air filter part and a method of packaging the air filter part are provided to suppress the absorption of organic substances by the air filter part. The air filter part is encased within a packaging material and has a filter medium capable of cleaning air in at least a part thereof. The dibutyl phthalate content per 1 g of the filter medium is 1.0 $\mu$g or lower when the filter medium is taken out of the encasing of the packaging material. The air filter package unit includes the air filter part, and a packaging material arranged so that the filter medium is shielded from outside air. The method of packaging an air filter includes a step of producing air filter part, a step of packaging the air filter part with a first material, and a step of further packaging the packaged air filter part with a second material.

28 Claims, 2 Drawing Sheets

PACKAGED AIR FILTER PART AND METHOD OF PACKAGING THE AIR FILTER PART

BACKGROUND OF THE INVENTION

1. Field of the Invention

The present invention relates to an air filter part having a filter medium capable of cleaning air in at least a portion thereof, and a method of packaging the air filter part. The air filter part is contained in a package that suppresses the absorption of organic substances by the air filter part and a method of packaging the air filter part.

2. Background Information

In a clean room or in a semiconductor production device, electronic parts such as semiconductors, liquid display devices are produced in an environment in which the air is treated to capture floating particles. For example, an air filter unit having high collection efficiency, such as HEPA (high efficiency particulate air) filter or ULPA (ultra low penetration air) filter is used to capture floating finer particles in a clean room or in a semiconductor production device. The air filter unit of this type is typically a unit equipped with a high collection type filter medium and a frame having the filter medium incorporated therein. The filter medium is formed by, for example, laminating a porous film formed by laminating polytetrafluoroethylene (hereinafter referred to as "PTFE" for simplicity) and non-woven fabrics arranged so as to interpose the PTFE porous film from both sides thereof. The filter medium is processed in a given shape that is incorporated inside the frame.

When such an air filter unit is placed at an airway of a clean room and operation is started, air outside the clean room permeates the air filter unit and is introduced into the clean room from the airway. At that time, floating fine particles in air are captured by the filter medium by the colliding fibers of the filter medium.

The air filter unit of this type is generally packed in a bag made of a resin such as polyethylene (hereinafter referred to as "PE" for simplicity) after production, the bag is further packaged with cardboard, and the package is then delivered. Furthermore, there is the case that a filter medium and a product obtained by processing the filter medium into a given shape (hereinafter referred to as an "air filter pleat pack") are each independently delivered in the state that it is packaged with the PE bag, the cardboard or the like.

Not only floating fine particles but also gaseous organic substances generated from paint or the like on walls of a clean room although a slight amount floats in a clean room. If those substances adhere onto semiconductor elements, wafers or the like, the electric properties of the products are impaired, and this results in decrease in the quality of products. In particular, high boiling point substances such as dioctyl phthalate (hereinafter referred to as "DOP" for simplicity), dibutyl phthalate (hereinafter referred to as "DBP" for simplicity), hydrocarbons having at least 15 carbon atoms or the like are difficult to volatilize. As a result, once those substances are adhered onto products, it is difficult to remove those substances from the products. For this reason, a chemical filter is often arranged within the clean room in order to remove those organic substances, and the amount of floating substances is suppressed to a predetermined standard or less.

However, according to the recent studies by the applicant of the present invention, it has been understood that those organic substances are generated not only from the interior walls of the clean room, but also from the air filter unit itself arranged within the clean room. In addition, it has been determined that those organic substances are generated from outside air and in particular from cardboard as a packaging material, and adsorbed on the filter medium, and the organic substances may possibly be generated from the PE bag.

In the conventional packaging form, a filter material such as a PE bag is arranged between an air filter unit and cardboard. Since organic substances generated from the cardboard permeate the PE bag, the organic substances are already in a state of adhering to the filter medium before use. Similar problems like this also occur in the case where a filter medium or the air filter pleat pack is independently packaged. In particular, a high collection type filter medium using PTFE porous film is more apt to adsorb such organic substances as compared with the conventional glass filter medium.

An air filter unit disclosed in Japanese Patent Laid-Open Application No. Hei 10-286415 is already proposed as an air filter part, in which content of organic substances is suppressed to a predetermined amount or less. In the air filter unit disclosed in this Japanese publication, measurement of the content of organic substances is conducted by a purge and trap method. In this conventional method, air having a temperature of about 40° C. is blown through an air filter unit at a predetermined flow rate. Then, the amount of organic substances detected from the air permeating through the other side of the air filter unit is measured. Thus, the amount of organic substances contained in the air filter unit is measured.

In this method, organic substances having relatively low boiling point can effectively be measured. However, regarding organic substances having high boiling point such as boiling point exceeding 270° C., since measurement conditions are mild, the organic substances cannot sufficiently be separated from the air filter unit. As a result, the content of high boiling point substances such as DBP or DOP cannot effectively be measured.

In view of the above, there exists a need for an air filter part which overcomes the above mentioned problems in the prior art. This invention addresses this need in the prior art as well as other needs, which will become apparent to those skilled in the art from this disclosure.

SUMMARY OF THE INVENTION

Accordingly, an object of the present invention is to suppress adhesion of organic substances from the packaging onto an air filter.

The present invention provides an air filter part having a filter medium capable of cleaning air in at least a portion thereof, in which the DBP content per 1 g of the filter medium is 1.0 $\mu$g or less prior to use of the filter medium.

The "air filter part" of the present invention as used herein includes, for example, but not limited to, a filter medium, an air filter pleat pack and an air filter unit (each being described hereinafter). The air filter unit is mainly explained below as an example of the air filter part.

As previously mentioned, although in slight amounts, gaseous organic substances such as DBP, DOP, hydrocarbons having at least 15 carbon atoms, and the like are generated from paint or the like on the interior walls of the clean room. These gaseous organic substances can degrade the products being produced in the clean room. For example, a chemical filter is typically arranged in the clean room in order to remove the organic substances. Thus, the amount of floating substances in the clean room is suppressed to a predetermined standard or less.

However, according to the recent studies by the applicant of the present invention, it has been understood that those organic substances are generated not only from the interior walls of the clean room, but also from the air filter unit itself arranged in the clean room or a semiconductor production device or the like. In addition, it has been determined from the studies by the applicant of the present invention that the air filter unit is already in a state contaminated with those organic substances prior to using the same.

Therefore, the air filter part of the present invention is prepared such that the DBP content per 1 g of a filter medium is a given predetermined amount or less prior to use, and thus, the inside of the clean room is suppressed from contamination in the case where the air filter part is arranged in the clean room.

The term "prior to use" as used herein means the time at which the package of the air filter unit is opened after at least about 50 hours in the package so as to remove the air filter part containing the filter medium. The DBP content per 1 g of the filter medium is preferably 0.2 $\mu$m/g or less prior to use of the filter medium.

It is desirable in the air filter part of the present invention to measure the content of high boiling point substances such as DBP or DOP by a measurement method such as a hexane extraction method (described hereinafter) that can separate a sufficient amount of organic substances having high boiling point as compared with the purge and trap method.

According to a second aspect of the present invention, the DOP content in the air filter part of a first aspect of the present invention is 1.0 $\mu$g or less per 1 g of a filter medium prior to use of the filter medium. In this air filter part, the DOP content per 1 g of a filter medium is less than a predetermined amount prior to use. Due to this, in the case where the air filter part prior to use is arranged in a clean room, the inside of the clean room can be suppressed from contamination. The DOP content per 1 g of the filter medium is preferably 0.2 $\mu$g/g or less prior to use of the filter medium.

According to a third aspect of the present invention, the air filter part of the first or second aspect of the present invention, the content of hydrocarbons having at least 15 or more carbon atoms per 1 g of the filter medium is 50 $\mu$g or less prior to use of the filter medium. In this air filter part, the content of hydrocarbons having at least 15 carbon atoms per 1 g of a filter medium is less than a predetermined amount prior to use of the filter medium. Due to this, in the case where the air filter part prior to use is arranged in a clean room, the inside of a clean room can be suppressed from contamination. The content of hydrocarbons having at least 15 carbon atoms per 1 g of a filter medium is preferably 20 $\mu$g/g or less.

According to a fourth aspect of the present invention, the air filter part of any one of the first to third aspects of the present invention, the filter medium comprises a filter layer at least partially constructed of a PTFE porous film and an air-permeable support material laminated on at least one side of the filter layer. A conventional filter medium for an air filter, such as a glass filter medium, is made of fibers which have large diameters and has large space between fibers. For this reason, the glass filter medium has relatively small adsorption of gaseous organic substances such as DBP or DOP.

On the other hand, in the high collection type filter medium using a PTFE porous film, the fibers are fine with the space between the fibers being relatively small as compared with the conventional glass filter medium.

However, since the high collection type filter medium using a PTFE porous film has a fine fiber diameter, it is more likely liable to adsorb gaseous organic substances such as DBP or DOP as compared with the conventional glass filter medium. Therefore, in the air filter part, particularly the air filter part using a PTFE porous film, the content of organic substances such as DBP or DOP per 1 g of the filter medium prior to use is determined to be less than the predetermined amount. Due to this, even in the case where the air filter part using the PTFE porous film is arranged in a clean room, the clean room can effectively be suppressed from contamination.

According to a fifth aspect of the present invention, in the air filter part of any one of the first to fourth aspects of the present invention, the filter medium has a PF (Performance Factor) value of 20 or more. The collection efficiency and the pressure loss are two characteristics used to determine the performance of a filter medium. The PF value is calculated by the following equation:

$$PF=[-\log(\text{penetration}(\%)/100)/(\text{pressure loss (pa)}/9.8)]\times 100 \text{ in which penetration}(\%)=100-\text{collection efficiency}(\%).$$

The pressure loss in this equation is determined by passing air through the filter medium at a flow velocity of 53 mm/sec and measuring the pressure differential between the air pressure on both sides of the filter. The collection efficiency in this equation is determined by measuring the amount of DOP having a particle size in the range of 0.10 $\mu$m to 0.12 $\mu$m that passes through the filter medium.

The PF (Performance Factor) value is frequently used as a measure for observing balance of the collection efficiency and the pressure loss. It is considered that a filter medium having a high collection efficiency and a small pressure loss increases the PF value of the filter medium.

The high collection type filter medium using a PTFE porous film is liable to adsorb organic substances such as DBP or DOP as previously described, and a filter medium having a high PF value has particularly strong tendency to adsorb such organic substances.

The air filter part, particularly the air filter part having a PF value higher than a predetermined value, is manufactured such that the content of organic substances such as DBP or DOP is less than the predetermined amount. For this reason, even in the case where the air filter part having a high PF value is arranged in a clean room, the clean room can effectively be suppressed from contamination.

As the PF of the air filter part increases, the structure of the air filter part more readily adsorbs organic substances such as DBP or DOP. The reason for this is as follows. The fiber diameter of a PTFE porous film used as an air filter is generally small as about 0.05 $\mu$m to 0.2 $\mu$m. As the PF value increases, the fiber diameter becomes finer. If the PF value exceeds 22, the fiber diameter will be 0.14 $\mu$m or less, further about 0.05 $\mu$m to 0.1 $\mu$m. Therefore, the PF value of the air filter part of the present invention preferably exceeds 22.

Thus, according to a sixth aspect of the present invention, in the air filter part of the fifth aspect of the present invention, the filter medium has a PF value exceeding 22.

A package of the air filter part according to a seventh aspect of the present invention comprises the air filter part of any one of the first to sixth aspects of the present invention and a packaging material arranged so as to shield the air filter part from outside air. The air filter part, such as an air filter unit, is packed in a bag made of a resin such as PE after production thereof. The air filter part packed in a bag is further packaged with cardboard or the like. The package is then delivered, as described above. It has been considered that by shielding the air filter part from outside air until use, the air filter part can maintain a clean state as when produced in a factory.

However, it has been determined as described above that the air filter part using a PTFE porous film, particularly one with high PF value, is already contaminated with organic substances such as DBP or DOP prior to use. Furthermore, it has become apparent from the studies by the applicant of the present invention that those organic substances are generated from outside air and packaging material such as cardboard. Thus, those organic substances are possibly adsorbed on the air filter part by permeating the PE bag. Furthermore, it has become apparent from the studies by the applicant of the present invention that those organic substances may be possibly generated from the PE bag itself.

In the package of the air filter part of the present invention, the air filter part is packaged so as to be shielded from outside air by the packaging material, and the air filter unit is packaged such that the content of organic substances such as DBP or DOP is below the predetermined amount even if the package is opened after the passage of a certain time from packaging.

Therefore, adhesion of organic substances such as DBP or DOP to the air filter part in the packaged state is suppressed in this embodiment.

According to an eighth aspect of the present invention, the packaging material for the package of the air filter part has a first material with a polyester film layer in at least a portion thereof. In the package of the air filter part, the first material contained in the packaging material has a polyester film layer capable of shielding permeation of organic substances such as DBP or DOP. As a result, the organic substances in the outside air scarcely permeate through the first material to enter inside the first material. Therefore, adhesion of organic substances such as DBP or DOP to the air filter part in the packaged state is suppressed in this embodiment. The polyester film layer is preferably a film layer constructed of polyethylene terephthalate (hereinafter referred to as "PET" for simplicity).

According to a ninth aspect of the present invention, the package of the air filter part comprises the air filter part having a filter medium in at least a portion thereof capable of cleaning air, and a packaging material arranged so as to shield the air filter part from outside air. The packaging material has a first material having an oxygen permeability of less than 20,000 ml/(m²·day·Mpa). As mentioned above, it has been considered that the air filter part can maintain a clean state as when produced in a factory by being shielded from outside air by the packaging material until use. However, it has become apparent by the studies of the applicant of the present invention that those organic substances generated from the outside air and the cardboard of the packaging material permeate a PE bag and are absorbed into the filter medium. Moreover, those organic substances may also be possibly generated from the PE bag itself. Therefore, in the package of the air filter part, the air filter part is packaged with the first material having oxygen permeability lower than the predetermined value. Thus, gaseous substances in outside air are suppressed from permeating the first material. Therefore, adhesion of organic substances to the air filter part in the packaged state is suppressed in this embodiment.

The first material of the packaging has an oxygen permeability of preferably less than approximately 10,000 ml/(m²·day·Mpa), more preferably between 0 and 5,000 ml/(m²·day·Mpa), and most preferably between 0 and 2,700 ml/(m²·day·Mpa). The oxygen permeability is a value measured according to a measurement method defined by JIS-Z-1707.

According to a tenth aspect of the present invention, in the package of the air filter part of the ninth aspect of the present invention, the filter medium comprises a filter layer at least partially constructed of a PTFE porous film and an air-permeable support material laminated on at least one side of the filter layer. The filter medium preferably has air-permeable support layers laminated on both sides of the filter layer by heat fusing.

According to an eleventh aspect of the present invention, in the package of the air filter part of the ninth or tenth aspect of the present invention, the filter medium has a PF value of 20 or more. The PF value is calculated by the following equation:

$$PF=[-\log(\text{penetration}(\%)/100)/(\text{pressure loss}(pa)/9.8]\times 100 \text{ in which penetration}(\%)=100-\text{collection efficiency}(\%).$$

The pressure loss in this equation is determined by passing air through the filter medium at a flow velocity of 53 mm/sec and measuring the pressure differential between the air pressure on both sides of the filter. The collection efficiency in this equation is determined by measuring the amount of DOP having a particle size in the range of 0.10 μm to 0.12 μm that passes through the filter medium.

According to a twelfth aspect of the present invention, in the package of the air filter part of the eleventh aspect of the present invention, the filter medium has PF value exceeding 22.

According to a thirteenth aspect of the present invention, in the package of the air filter part of any one of the ninth to twelfth aspects of the present invention, the first material has a polyester film layer in at least a portion thereof. In this package of the air filter part, the first material contained in the packaging material has a polyester film layer capable of shielding permeation of organic substances. As a result, organic substances in the outside air scarcely permeates the first material to enter the inside the first material. Therefore, adhesion of organic substances to the air filter part in the packaged state is suppressed in this embodiment. The polyester film layer is preferably a film layer comprising PET.

According to a fourteenth aspect of the present invention, the package of the air filter part comprises the air filter part having in at least a portion thereof, a filter medium capable of cleaning air, and the packaging material arranged so as to shield the air filter part from outside air. The packaging material for the package of the air filter part has a first material with a polyester film layer in at least a portion thereof. The polyester film layer has a thickness of 1 μm or more. As mentioned before, it has been considered that the air filter part, particularly the air filter part using the PTFE porous film having a high PF value, can maintain a clean state as when produced in a factory by being shielded from outside air by the packaging material until use. However, it has become apparent by the studies of the applicant of the present invention that those organic substances generated from outside air and the cardboard of the packaging material, permeate a PE bag and are absorbed into the filter medium. Moreover, those organic substances may be possibly generated from the PE bag itself.

Therefore, in this package of the air filter part, a polyester film layer as the first material having a thickness of 1 μm is used. Thus, the polyester film layer suppresses oxygen permeability to a value lower than the predetermined value. Due to this, gaseous substances are suppressed from permeating the first material. Therefore, adhesion of organic substances to the air filter part in the packaged state is suppressed in this embodiment.

According to a fifteenth aspect of the present invention, in the package of the air filter part of the fourteenth or fifteenth aspect of the present invention, the filter medium comprises a filter layer at least partially constructed of a PTFE porous film and an air-permeable support material laminated on at least one side of the filter layer.

According to a sixteenth aspect of the present invention, in the package of the air filter part of the fourteenth or fifteenth aspect of the present invention, the filter medium has a PF value of 20 or more. The PF value is calculated by the following equation:

$$PF=[-\log(\text{penetration}(\%)/100)/(\text{pressure loss(pa)}/9.8]\times100 \text{ in which penetration}(\%)=100-\text{collection efficiency}(\%).$$

The pressure loss in this equation is determined by passing air through the filter medium at a flow velocity of 53 mm/sec and measuring the pressure differential between the air pressure on both sides of the filter. The collection efficiency in this equation is determined by measuring the amount of DOP having a particle size in the range of 0.10 $\mu$m to 0.12 $\mu$m that passes through the filter medium.

According to a seventeenth aspect of the present invention, the package of the air filter part of the sixteenth aspect of the present invention, the filter medium has PF value exceeding 22. According to an eighteenth aspect of the present invention, in the package of the air filter part of any one of the fourteenth to seventeenth aspects of the present invention, the polyester film layer has a thickness of 9 $\mu$m or more. In the package of the air filter part, due to that the first material has a polyester film having a thickness of 9 $\mu$m or more, oxygen permeability is further decreased. As a result, it is possible to further effectively suppress gaseous substances in outside air from permeating the first material. Further, since the polyester film layer has a thickness of a certain value or more, the first material can easily be produced. The polyester film has a thickness of preferably between 9 $\mu$m and 50 $\mu$m, more preferably between 9 $\mu$m and 20 $\mu$m. Furthermore, the polyester film layer is preferably a film layer comprising PET.

According to a nineteenth aspect of the present invention, in the package of the air filter part of any one of the eighth and thirteenth to eighteenth aspects of the present invention, the polyester film is arranged at the innermost side of the first material. In this package of the air filter part, since the polyester film is arranged at the position closest to the air filter part, the organic substances do not substantially permeate the polyester film layer even in the case, for example, that the other layer of the first material may generate organic substances. Therefore, it is possible to further sufficiently suppress adhesion of organic substances to the air filter part.

According to a twentieth aspect of the present invention, in the package of the air filter part of the nineteenth aspect of the present invention, the first material further has a PE film layer. In this package of the air filter part, the air filter part is packaged with the first material having a PE film layer which may generate organic substances. However, since the first material has polyester film layer as an innermost layer, it is possible to suppress that the organic substances completely permeate the first material.

According to a twenty-first aspect of the present invention, in the package of the air filter part of any one of the eighth to twentieth aspects of the present invention, the packaging material further has a second material arranged outside the first material. In this package of the air filter part, the air filter part is packaged with the first material, and is further packaged with the second material from the outside of the first material. In this embodiment, the first material has a polyester film layer capable of shielding permeation of organic substances. As a result, even in the case that the second material may generate organic substances, the organic substances generated from the second material scarcely permeate the first material. Therefore, even in this packaging embodiment, it is possible to suppress adhesion of organic substances to the air filter part.

According to a twenty-second aspect of the present invention, in the package of the air filter part of the twenty-first aspect of the present invention, the second material is cardboard. In this package of the air filter part, the air filter part is packaged with the first material, and is further packaged with the cardboard from the outside of the first material. In this embodiment, the first material has a polyester film layer capable of shielding permeation of organic substances. As a result, even in the case that organic substances such as DBP or DOP generate from the cardboard, the organic substances generated from the second material scarcely permeate the first material. Therefore, even in this packaging mode, it is possible to suppress adhesion of organic substances to the air filter part.

The method of packaging the air filter part according to a twenty-third aspect of the present invention comprises a first step, a second step and a third step. The first step produces the air filter part having a filter medium capable of cleaning air in at least a portion thereof. The second step is that the air filter part is packaged with the first material having a polyester film layer in at least a portion thereof such that the air filter part is shielded from outside air. The third step is that the air filter part packaged with the first material is further packaged with the second material so as to be further shielded from outside air. As mentioned above, it has been considered that the air filter part can maintain a clean state as when produced in a factory by being shielded from outside air by the packaging material until use. However, it has become apparent by the studies of the applicant of the present invention that those organic substances generated from the cardboard of the packaging material may permeate PE bag, and thus, are adhered to the filter medium. Moreover, those organic substances may also be possibly generated from the PE bag itself.

Therefore, in the method of packaging the air filter part, the first material capable of shielding permeation of the organic substances is arranged between the air filter part and the second material. Due to this, even in the case that the organic substances are generated from the second material, adhesion of the organic substances to the air filter part is suppressed. The polyester film layer is preferably a film layer comprising PET.

According to a twenty-fourth aspect of the present invention, in the method of packaging the air filter part of the twenty-third aspect of the present invention, the air filter part has a filter medium comprising a filter layer at least partially constructed of PTFE, and an air-permeable support material laminated on at least one side of the filter layer.

According to a twenty-fifth aspect of the present invention, in the method of packaging the air filter part of the twenty-third or twenty-fourth aspect of the present invention, the filter medium has a PF value of 20 or more. The PF value is calculated by the following equation:

$$PF=[-\log(\text{penetration}(\%)/100)/(\text{pressure loss(pa)}/9.8]\times100 \text{ in which penetration}(\%)=100-\text{collection efficiency}(\%).$$

The pressure loss in this equation is determined by passing air through the filter medium at a flow velocity of 53 mm/sec and measuring the pressure differential between the air pressure on both sides of the filter. The collection efficiency in this equation is determined by measuring the amount of DOP having a particle size in the range of 0.10 $\mu$m to 0.12 $\mu$m that passes through the filter medium.

According to a twenty-sixth aspect of the present invention, in the method of packaging the air filter part of the twenty-fifth aspect of the present invention, the filter medium has a PF value exceeding 22.

According to a twenty-seventh aspect of the present invention, in the method of packaging the air filter part of any one of the twenty-third to twenty-sixth aspects of the present invention, the polyester film layer is arranged at the innermost side of the first material. In this method, since the polyester film layer is arranged at the position closest to the air filter part, even in the case, for example, that other layer of the first material may generate the organic substances, the organic substances scarcely permeate the polyester film layer. Therefore, it is possible to further sufficiently suppress adhesion of the organic substances to the air filter part.

According to a twenty-eighth aspect of the present invention, in the method of packaging the air filter part of any one of the twenty-third to twenty-seventh aspects of the present invention, the second material is cardboard. In this method, the air filter part packaged with the first material is further packaged with the second material from the outside of the first material. In this embodiment, the first material has a polyester film layer capable of shielding permeation of the organic substances. As a result, even in the case that the organic substances such as DBP or DOP are generated from the cardboard, the organic substances generated from the second material scarcely permeate the first material. Therefore, even in this packaging mode, it is possible to suppress adhesion of the organic substances to the air filter part. The polyester film layer is preferably a film layer comprising PET.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention are provided for illustration only, and not for the purpose of limiting the invention as defined by the appended claims and their equivalents.

Air Filter Unit Package

Figure 1:
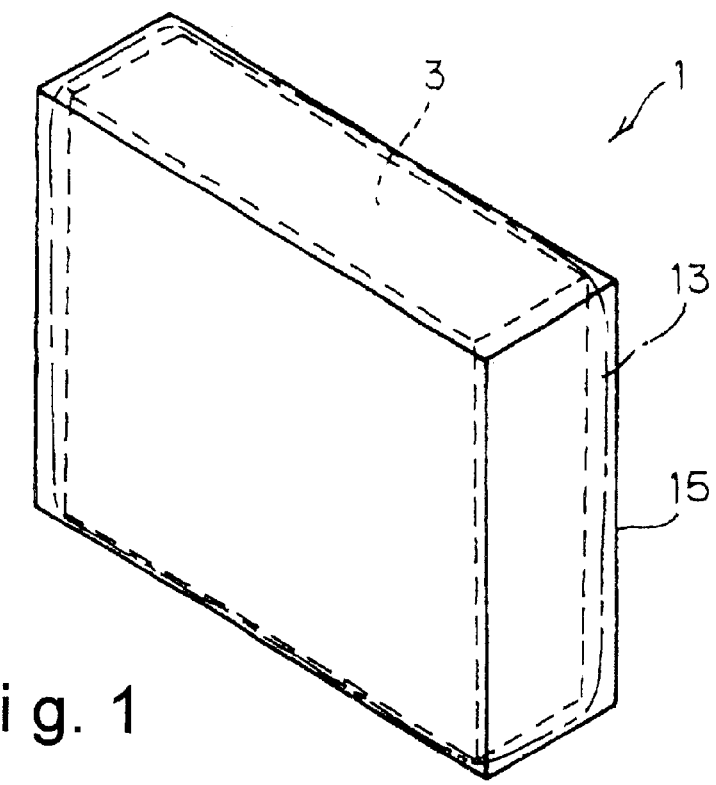
FIG. 1 is a perspective view showing an air filter unit package constructed in accordance with one embodiment of the present invention.

Referring to initially to FIG. 1, an air filter unit package 1 is illustrated in accordance with one embodiment of the present invention. The air filter unit package 1 basically has an air filter unit 3, a film material 13 and a casing material 15. The film material 13 encases the air filter unit 3, while the casing material 15 encases the air filter unit 3 and the film material 13. Thus, the film material 13 and the casing material 15 form the packaging material for the air filter unit 3.

Air Filter Unit

Figure 2:
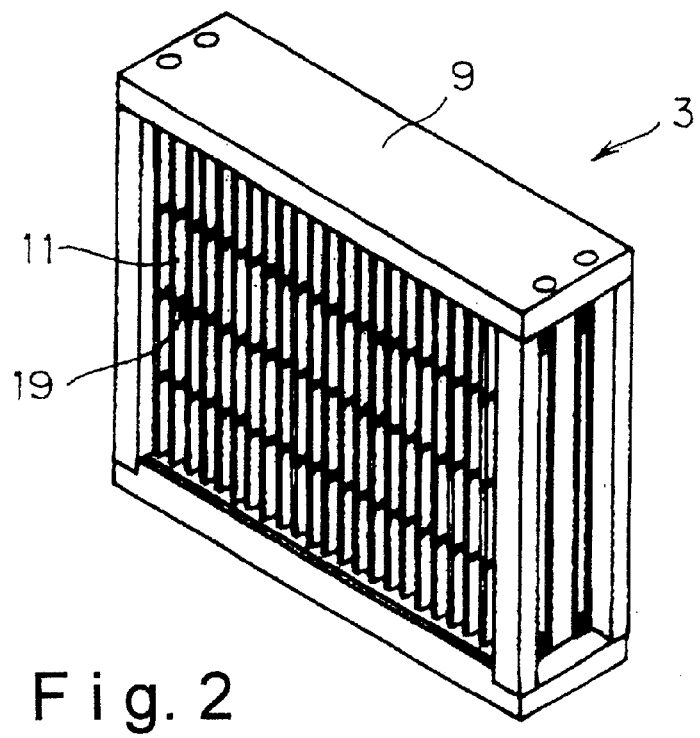
FIG. 2 is a perspective view showing an air filter unit in accordance with the present invention after being removed from the air filter unit package shown in FIG. 1.
Figure 3:
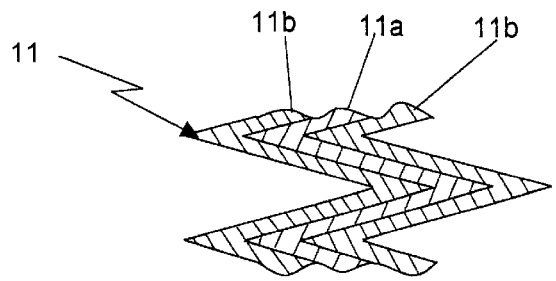
FIG. 3 is a partial diagrammatic cross-sectional view of a portion of the filter medium used in the air filter unit shown in FIG. 2.

Referring to FIGS. 2 and 3, the air filter unit 3 to be contained within the air filter unit package 1 of FIG. 1 is illustrated. The air filter unit 3 is basically equipped with a frame 9 and a filter medium 11. The filter medium 11 is incorporated in the frame 9 to form a single unit.

The filter medium 11 is a sheet material comprising a PTFE porous film 11a and two layers 11b of an air-permeable support material arranged so as to interpose the PTFE porous film 11a between two layers 11b of an air-permeable support material. The PTFE porous film 11a and the air-permeable support layers 11b are laminated by heat fusion in a conventional manner. The PTFE porous film 11a has a thickness of about 1 $\mu$m to about 60 $\mu$m, and a fiber diameter of 0.05 $\mu$m to 0.2 $\mu$m, preferably 0.05 $\mu$m to 0.14 $\mu$m, more preferably about 0.05 $\mu$m to about 0.1 $\mu$m. The PF value is preferably 20 or more, and more preferably over 22. The air-permeable support layers 11b are each a non-woven fabric having a basis weight of about 15 g/m$^2$ to 100 g/m$^2$, preferably 20 g/m$^2$ to 70 g/m$^2$, and preferably a non-woven fabric comprising fibers having a core/shell structure. The filter medium 11 is such that the pressure loss caused when permeating air at a flow velocity of 53 mm/sec is between 98 pa to 980 pa, and the collection efficiency of DOP having particle size in the range of 0.10 $\mu$m to 0.12 $\mu$m is 99.0% or higher, preferably 99.9% or higher, more preferably 99.99% or higher.

Prior to use of the filter medium 11, the filter medium 11 has DOP and DBP contents of 1.0 $\mu$g/g or lower, preferably 0.2 $\mu$g/g or lower. The DOP and DBP contents are detected amounts of DOP and DBP detected by a hexane extraction method described hereinafter.

The filter medium 11 is formed into a wave shape by alternately folding back in every width of 15 to 150 mm, and a space of the adjacent folded back portions is maintained about 2 to 15 mm by a spacer or a wave-shape separator 19. This state is called an air filter pleat pack.

The frame 9 is formed by assembling four aluminum-made frame materials, and the filter medium 11 is incorporated in the inside space thereof in the state that it is maintained in a predetermined shape by the spacer 19. The frame 9 and the filter medium 11 are sealed with an adhesive or the like to maintain air-tightness, thereby forming the air filter unit 3.

Film Material

Figure 4:
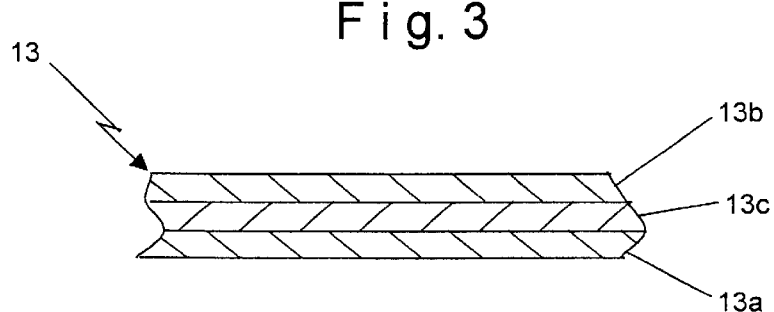
FIG. 4 is a partial diagrammatic cross-sectional view of a portion of the film material encasing the air filter shown in FIG. 2.

The film material 13 is a resin-made bag (e.g., "SPERREN", a product of Ube Film K.K.) arranged so as to cover the outside of the air filter unit 1. As seen in FIG. 4, the film material 13 comprises an inside film layer 13a on the air filter unit 1 side and an outside film layer 13b outside air side, and an interlayer 13c between those film layers 13a and 13b. The inside film layer 13a is a polyester film layer that is the layer closest to the air filter unit 1. Preferably, the inside or polyester film layer is a film layer constructed of polyethylene terephthalate (PET). The outside film layer 13b is a linear low density polyethylene (hereinafter referred to as "LLDPE" for simplicity) film layer. The interlayer 13c is a layer for adhering the two film layers together, and comprises an adhesive plastic (hereinafter referred to as "ADH" for simplicity). Thickness of layers 13a, 13b and 13c of the film material 13 is about 15 µm for the inside film layer 13a, about 10 µm for the interlayer 13c and about 30 µm for the outside film layer 13b.

The film material 13 is not limited to a bag having the structure mentioned above. For example, the film material 13 can be made by turning inside out a "plain bag" produced by Fujimori Kogyo K.K. Once the "plain bag" is turned inside out, the resulting film material has a PE film layer as the outside layer and a PET film layer as the inside layer with an anchor coat (hereinafter referred to as "AC" for simplicity) adhering the inside and outside layers together. Thickness of each layer in this film material 13 is preferably about 12 µm for the inside or PET film layer 13a and about 50 µm for the outside or PE film layer 13b (the AC layer substantially has a thickness of 0 µm).

Casing Material

The casing material 15 is to further package the outside of the air filter unit 1 packaged within the film material 13. In this practical embodiment, cardboard is used for the casing material 15. Alternatively, the casing material 15 may be, for example, a resin-made plastic case, or any other suitable material other than cardboard.

In the air filter unit package 1, the film material 13 has the inside PET film layer 13a capable of shielding permeation of organic substances such as DOP or DBP. For this reason, the organic substances generated from the casing material or cardboard 15 scarcely permeate the film material 13 to enter in the inside of the film material 13. Therefore, in this air filter unit package 1, adhesion of organic substances to the filter medium 11 when packaged is suppressed.

In the case that the air filter unit package 1 is opened and the air filter unit 3 is arranged in an airway of a clean room or in a semiconductor production device, air outside the clean room permeates the filter medium 11 and then enters the clean room. In this case, floating fine particles in the air are captured by the filter medium 11 by colliding fibers of the PTFE porous film 11a, and floating fine particles in the air are gradually reduced.

Conventional measurement of the content of organic substances has been carried out by a purge and trap method. In this conventional method, air having a temperature of about 40° C. is blown through an air filter unit at a predetermined flow rate. Then, the amount of organic substances detected from the air permeating through the air filter unit is measured. Thus, the amount of organic substances contained in the air filter unit is measured.

This conventional testing method can effectively measure organic substances having relatively low boiling point. However, organic substances having a high boiling point, for example, a boiling point over 270° C. are difficult to measure using this testing method. Since the measurement conditions are mild for this testing method, such organic substances cannot be sufficiently separate from the air filter unit. As a result, even if high boiling substances such as DBP or DOP are actually contained in large amounts in the filter medium, the measurement results will not indicate the presence of these high boiling substances. Rather, only substances with a low boiling point will be detected.

Test Example 1

Therefore, in this Test Example 1, the measurement of the content of high boiling substance such as DBP or DOP contained in the filter medium was carried out by a hexane extraction method such that even organic substances having high boiling point can be liberated in sufficient amount as compared with a purge and trap method.

Figure 5:
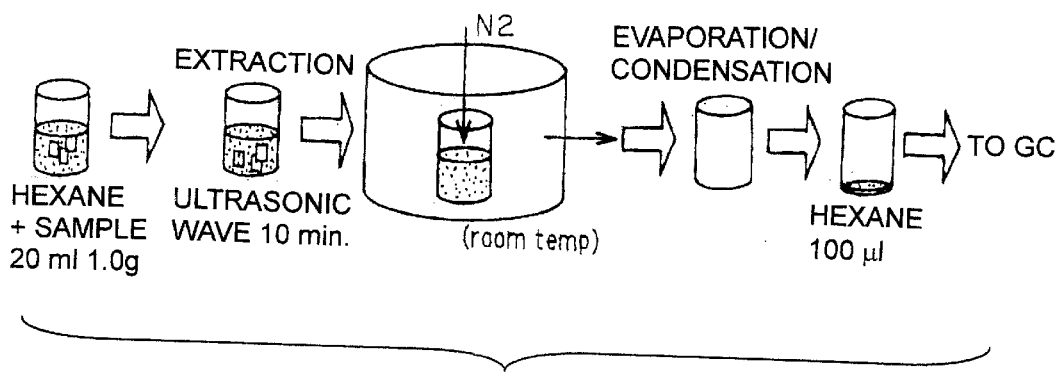
FIG. 5 is an explanatory view showing a method of performing Test Example 1.

Referring now to FIG. 5, an outline of an extraction test is illustrated for extracting organic substances from the filter medium 11 used in the air filter unit package 1 of the present invention. In this embodiment, organic substances in the filter medium 11 were extracted by a hexane extraction method described hereinafter.

The filter medium used in this Test Example 1 was produced by the method described in Example 4 of Japanese Patent Application No. Hei 11-286664. The production method will be explained below.

Twenty-five (25) parts by weight of a hydrocarbon oil (Isoper, a product of Esso Oil Co.) as an extrusion lubricant was added to 100 parts by weight of PTFE fine powder having a number average molecular weight of 6,200,000 (Polyflon Fine Powders F-104U, a product of Daikin Industries, Ltd.). These elements were then followed by a mixing procedure.

Next, the mixture was molded into a rod shape by a paste extrusion. This rod shape molding was shaped into a film to obtain a PTFE film with a calendar roll heated to 70° C. This film was then passed through a hot air drying furnace at 250° C. to remove the extrusion lubricant by evaporation, thereby obtaining an unsintered film with an average thickness of 200 µm and an average width of 150 mm.

This unsintered PTFE film was stretched in a longitudinal direction at a stretching ratio of 5 times using a conventional stretching apparatus. The stretching temperature in this case was 250° C. The longitudinally stretched film was stretched in transverse direction at a stretching ratio of 30 times using an apparatus (tenter) that can nip the longitudinally stretched filmed obtained with a continuous clip, and then heat set. In this case, the stretching temperature was 290° C., the heat setting temperature was 360° C. and the stretching rate was 330%/sec.

In this example, the filter medium 11 was constructed of an upper side of a polyethylene/polyester-made fusion bondable non-woven fabric such as ELEVES T0703WDO, a product of Unitika Co., and a lower side of ELEFIT EZ0353WTO, a product of Unitika Ltd. that were fusion bonded to the surfaces of the PTFE porous film obtained above without using nip rolls (i.e., substantially without applying pressure to a thickness direction). The fusion bonding conditions in this case were as follows.

Roll 19 heating temperature: 160° C.

Line speed: 15 m/min

Unwinding tension: 50 g/cm (Unwinding tension of non-woven fabric)

Winding tension: 250 g/cm

A filter medium piece was cut from the filter medium 11 obtained above, and a PF value of the filter medium piece was measured. As a result, the PF value was 26. The PF value is calculated by the following equation:

$$PF=[-\log(\text{penetration}(\%)/100)/(\text{pressure loss(pa)}/9.8] \times 100$$ in which penetration(%)=100−collection efficiency(%).

The pressure loss in this equation is determined by passing air through the filter medium at a flow velocity of 53 mm/sec and measuring the pressure differential between the air pressure on both sides of the filter. The collection efficiency in this equation is determined by measuring the amount of DOP having a particle size in the range of $0.10 \mu m$ to $0.12 \mu m$ that passes through the filter medium.

For the measurement of organic substance content explained below, the place of the filter medium 11 having a PF value of 26 where the measurement of a PF value was carried out was not used, and a place where the measurement of PF value was not carried out was used (Test Example 2 is the same).

Measurement method of organic substance content in the filter medium 11 by a hexane extraction method is explained below.

The following three kinds of samples of the filter medium 11 were tested:

(1) the filter medium prior to packaging (Reference Material), (2) the filter medium that was packaged with a film material in accordance with the present invention as described above (e.g., a film material such as "plain bag", a product of Fujimori Kogyo Co., was used inside out) and after carrying 50 hours or more, the package was opened (Example 1), (3) the filter medium that was packaged with a conventional film material (e.g., a film material composed only of LLDPE film layer) and after carrying 50 hours or more, the package was opened (Comparative Example 1).

Each of the samples were obtained by cutting 1.0 g of a filter medium piece from each filter medium 11. Then, each sample was placed in a sample bottle. Next, 20 ml of hexane was introduced into each sample bottle, and ultrasonic washing was carried out for 10 minutes with a ultrasonic washer. After completion of the ultrasonic washing, each sample was taken out of each sample bottle. The hexane was then allowed to evaporate at normal temperature in $N_2$ atmosphere. Then, $100 \mu l$ of fresh hexane was added to each sample bottle. The $2 \mu l$ solution was sampled from each hexane solution, and the content of each component (hydrocarbon having at least 15 carbon atoms, DOP and DBP) of organic substances was measured using conventional gas chromatography techniques. The measurement results are shown in Table 1 below.

TABLE 1

| Sample | Hydrocarbon $\mu g/g$ | DBP $\mu g/g$ | DOP $\mu g/g$ |
| --- | --- | --- | --- |
| 1 Filter medium only (for reference) | 20 or less | 0.05 | 0.19 |
| 2 Example 1 | 20 or less | 0.06 | 0.19 |
| 3 Comparative Example 1 | 50 or more | 1.06 | 0.72 |

As shown in Table 1, the content of the organic substances is greatly increased in the filter medium of Comparative Example 1 as compared with the filter medium prior to packaging. Contrary to this, the content of organic substances in the filter medium of Example 1 is almost the same as in the filter medium prior to packaging. Therefore, it is apparent that adhesion of organic substance during packaging is suppressed in the filter medium of Example 1 as compared with the filter medium of Comparative Example 1.

Test Example 2

Figure 6:
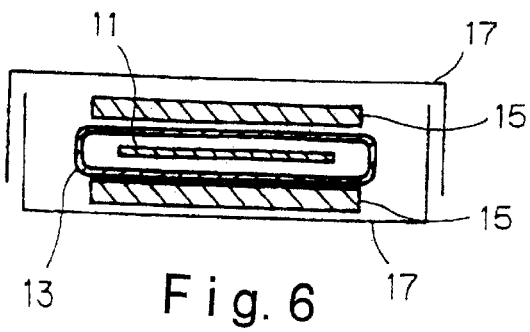
FIG. 6 is a diagrammatic vertically cross-sectional view showing a sample during the test in Test Example 2.

Referring now to FIG. 6, a sample is tested in Petri dish 17 using a gas barrier property evaluation test on the air filter unit package 1 of the present invention. In this test, a comparison was made on the content of the organic substances between a package in which the filter medium 11 was packaged with only the film material 13 and a package in which the filter medium 11 was packaged with the film material 13 and cardboard 15.

Five filter medium pieces having a predetermined size as samples were cut from the filter medium 11. Of those, four samples were covered with four kinds of film materials shown in Table 2 respectively in a clean room in which necessary measures for the organic substances were taken (arrangement of chemical filter, removal of generation source of the organic substances, and the like), and a opened portion of each sample was folded two or three so as not to permeate air.

Each sample covered with the film material was then sandwiched with two sheets of cardboard 15 to be placed in Petri dish 17. The Petri dish 17 was further covered with other film material that does not generate impurities to be sealed (Examples 2 and 3, and Comparative Examples 2 and 3), and heated in an oven at 60° C. for 3 days. After completion of the heating, taking the filter medium 11 out the oven, the amount of organic impurities contained in the filter medium was measured with a hexane extraction method.

For the sake of comparison, the same measurement was carried out on the sample which was not sandwiched between two sheets of cardboard 15 in Examples 2 and 3 and Comparative Examples 2 and 3. The measurement results are shown in Table 3. Determination results on the necessity of use of the filter medium 11 (degree of cleanness and gas barrier property), judging from the measurement results are also shown in Table 3.

Evaluation results in Table 2 show gas barrier property and impurity generation amount (O: generation amount is small; X: generation amount is large) of each film material 13.

TABLE 2

| Sample | Example 2 | Example 3 | Comparative Examples 2 | Comparative Examples 3 |
| --- | --- | --- | --- | --- |
| Constitution (inner/intermediate/outer) | PE/AC/PET | PET/ADH/PE | LLDPE | High purity LLDPE |
| Thickness $\mu m$ (inner/intermediate/outer) | 50/0/12 | 15/10/30 | 50 | 80 |
| Evaluation results | | | | |
| Gas barrier property | O | O | X | X |
| Impurity generation amount | O | O | X | X |

TABLE 3

|  | Packaged with only film material | | | Packaged with cardboard and film material | | | Determination on necessity of use | |
| --- | --- | --- | --- | --- | --- | --- | --- | --- |
|  | Hydrocarbon μg/g | DBP μg/g | DOP μg/g | Hydrocarbon μg/g | DBP μg/g | DOP μg/g | Degree of cleanness | Gas barrier property |
| Only filter medium (for reference) | 20 or less | 0.1 | 0.3 | — | — | — | — | — |
| Comparative Example 2 | 50 or more | 1.0 | 0.9 | 50 or more | 10.2 | 1.2 | X | X |
| Example 2 | 20 or less | 0.1 | 0.4 | 20 or less | 0.1 | 0.3 | ○ | ○ |
| Example 3 | 20 or less | 0.2 | 0.4 | 20 or less | 0.1 | 0.5 | ○ | ○ |
| Comparative Example 3 | 50 or more | 0.3 | 0.3 | 50 or more | 3.5 | 0.4 | X | X |

As shown in Table 3, in Comparative Examples 2 and 3 the detection amount of the organic substances in the case of sandwiching with cardboard is greatly increased as compared with the case of not sandwiching with sheets of cardboard. Therefore, it is considered that in the film materials used in Comparative Examples 2 and 3, the organic substances generated from cardboard permeate to be adsorbed on the filter medium 11. Contrary to this, in Examples 2 and 3, the content of the organic substances in the case of sandwiching with cardboards is substantially the same as in the case of not sandwiching with cardboards. Therefore, it is considered that the film materials used in Examples 2 and 3 effectively shield the organic substances generated from cardboards.

Packaging Method of Air Filter Unit

The packaging method of the air filter unit 3 in which an embodiment of the present invention is employed includes a unit production step, a step of packaging with a bag and a step of packaging within a box.

In the unit production step, the air filter unit 3 is produced. As described above, the air filter unit 3 is produced by incorporating the filter medium 11 processed into a predetermined shape, comprising the PTFE porous film 11a and air-permeable support layers 11b, in the frame 9 and by sealing air tightly between the filter medium 11 and the frame 9 with an adhesive.

In the step of packaging with a box, the filter medium 11 of the air filter unit 3 is packaged with the film material 13 so as to be shielded from outside air. The above-mentioned film material 13 is used as the film material covering the air filter unit 3.

In the step of packaging with a box, the air filter unit 3 packaged with the film material 13 is further packaged with a casing material 15 so as be shielded from outside air. The casing material 15 used is the above-mentioned cardboard. The casing material 15 may be, for example, a resin-made plastic case other than the cardboard.

Other Embodiments (a) The filter medium 11 is not limited to one using the PTFE porous film, and a filter medium using a porous film made of other resins may be used, or a filter medium such as glass filter medium comprising glass fibers may be used.

(b) The air filter unit package 1 is not limited to one in which the air filter unit 3 is packaged so as to cover the entirety, and it may be, for example, a package in which the film material 13 is adhered to two portions of an air inlet (front surface) and air outlet (back surface) so as to cover only portions that the filter medium 11 is exposed.

(c) The above embodiment is explained with respect to the case of packaging in the form of the air filter unit 3. However, even in the case of packaging in the form of the filter medium 11 and an air filter pleat pack, adhesion of the organic substances in air can be suppressed.

According to the present invention, since the air filter part is packaged with a packaging material capable of shielding the organic substances in outside air, adhesion of the organic substances in the packaged state is suppressed. In addition, this organic substance adhesion-suppressing effect is particularly excellent in the case that the filter medium has the PTFE porous film having high PF value.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An air filter part encased within a packaging material and comprising:

a filter medium constructed to clean air in at least a portion thereof, said filter medium having a dibutyl phthalate content that is no greater than 1.0 μg per 1 g of the filter medium when said filter medium is taken out of the encasing of the packaging material.

2. The air filter part according to claim 1, wherein said filter medium has a dioctyl phthalate content that is no greater than 1.0 μg per 1 g of the filter medium after said filter medium is taken out of the packaging material prior to use of said filter medium.

3. The air filter part according to claim 1, wherein
said filter medium has a content of hydrocarbon with at least 15 carbon atoms that is no greater than 50 μg per 1 g of the filter medium after said filter medium is taken out of the packaging material prior to use of said filter medium.

4. The air filter part according to claim 1, wherein
the filter medium comprises a filter layer at least partially constructed of polytetrafluoroethyelene and an air-permeable support material laminated on at least one side of the filter layer.

5. The air filter part according to claim 1, wherein
said filter medium has a PF value of at least 20, the PF value being calculated by a following equation:

$$PF=[-\log(\text{penetration}(\%)/100)/(\text{pressure loss}(pa)/9.8] \times 100 \text{ in which penetration}(\%)=100\text{-collection efficiency}(\%),$$

where the pressure loss in this equation is determined by passing air through said filter medium at a flow velocity of 53 mm/sec and measuring the pressure differential between the air pressure on both sides of said filter medium, the collection efficiency in this equation is determined by measuring the amount of dioctyl phthalate having a particle size in the range of 0.10 μm to 0.12 μm that passes through said filter medium.

6. The air filter part according to claim 5, wherein the PF value of the filter medium exceeds 22.

7. A packaged air filter part comprising:
a filter medium constructed to clean air in at least a portion thereof; and
a packaging material encasing said filter medium such that said filter medium is shielded from outside air, said filter medium having a dibutyl phthalate content that is no greater than 1.0 μg per 1 g of the filter medium when said filter medium is taken out of the encasing of said packaging material.

8. The packaged air filter part according to claim 7, wherein
said packaging material has a first material which has in at least a portion thereof a polyester film layer.

9. A packaged air filter part comprising:
a filter medium constructed to clean air in at least a portion thereof, and
a packaging material arranged to encase said filter medium such that said filter medium is shielded from outside air, the packaging material including a first material with an oxygen permeability of less than 20,000 ml/(m$^{-2}$day MPa).

10. The packaged air filter part according to claim 9, wherein
the filter medium comprises a filter layer at least partially constructed of polytetrafluoroethyelene and an air-permeable support material laminated on at least one side of the filter layer.

11. The packaged air filter part according to claim 9, wherein
said filter medium has a PF value of at least 20, the PF value being calculated by the following equation:

$$PF=[-\log(\text{penetration}(\%)/100)/(\text{pressure loss}(pa)/9.8] \times 100 \text{ in which penetration}(\%)=100\text{-collection efficiency}(\%),$$

where the pressure loss in this equation is determined by passing air through said filter medium at a flow velocity of 53 mm/sec and measuring the pressure differential between the air pressure on both sides of said filter medium, the collection efficiency in this equation is determined by measuring the amount of dioctyl phthalate having a particle size in the range of 0.10 μm to 0.12 μm that passes through said filter medium.

12. The packaged air filter part according to claim 11, wherein the PF value of the filter medium exceeds 22.

13. The packaged air filter part according to claim 9, wherein the first material includes a polyester film layer in at least a portion thereof.

14. A packaged air filter part comprising:
an air filter part having a filter medium constructed to clean air in at least a portion thereof, and
a packaging material arranged to encase said filter medium such that said filter medium is shielded from outside air, the packaging material including a first material including a polyester film layer in at least a portion thereof with the polyester film layer having thickness of at least 1 μm.

15. The packaged air filter part according to claim 14, wherein the filter medium comprises a filter layer at least partially constructed of polytetrafluoroethyelene and an air-permeable support material laminated on at least one side of the filter layer.

16. The packaged air filter part according to claim 14, wherein
said filter medium has a PF value of at least 20, the PF value being calculated by the following equation:

$$PF=[-\log(\text{penetration}(\%)/100)/(\text{pressure loss}(pa)/9.8] \times 100 \text{ in which penetration}(\%)=100\text{-collection efficiency}(\%),$$

where the pressure loss in this equation is determined by passing air through said filter medium at a flow velocity of 53 mm/sec and measuring the pressure differential between the air pressure on both sides of said filter medium, the collection efficiency in this equation is determined by measuring the amount of dioctyl phthalate having a particle size in the range of 0.10 μm to 0.12 μm that passes through said filter medium.

17. The packaged air filter part according to claim 16, wherein the PF value of the filter medium exceeds 22.

18. The packaged air filter part according to claim 14, wherein the polyester film layer has a thickness of at least 9 μm.

19. The packaged air filter part according to claim 13, wherein the polyester film layer is arranged at an innermost side of the first material.

20. The packaged air filter part according to claim 19, wherein the first material further includes a polyethylene film layer.

21. The packaged air filter part according to claim 9, wherein the packaging material further includes a second material arranged outside the first material.

22. The packaged air filter part according to claim 21, wherein the second material includes a cardboard layer.

23. A method of packaging an air filter part, comprising the steps of:
producing an air filter part having a filter medium constructed to clean air in at least a portion thereof,
packaging the air filter part with a first material having a polyester film layer in at least a portion thereof such that said first material encases the air filter part and the air filter part is shielded from outside air, and
packaging the packaged air filter part that is packaged with the first material with the second material, such that the air filter part is encased with the second material and further shielded from outside air, such that the filter medium has a dibutyl phthalate content that is no greater than 1.0 µg per 1 g of the filter medium when the filter medium is taken out of the encasing of the first material.

24. The method of packaging an air filter part according to claim 23, further comprising the step of
constructing the filter medium with a filter layer at least partially constructed of polytetrafluoroethyelene and an air-permeable support material laminated on at least one side of the filter layer.

25. The method of packaging an air filter part according to claim 23, wherein
said filter medium is constructed so as to have a PF value of at least 20, the PF value being calculated by the following equation:

$$PF=[-\log(\text{penetration}(\%)/100)/(\text{pressure loss(pa)}/9.8] \times 100 \text{ in which penetration}(\%)=100-\text{collection efficiency}(\%),$$

where the pressure loss in this equation is determined by passing air through said filter medium at a flow velocity of 53 mm/sec and measuring the pressure differential between the air pressure on both sides of said filter medium, the collection efficiency in this equation is determined by measuring the amount of diocytyl phthalate having a particle size in the range of 0.10 µm to 0.12 µm that passes through said filter medium.

26. The method of packaging an air filter part according to claim 25, further comprising the step of
constructing the filter medium such that the PF value exceeds 22.

27. The method of packaging an air filter part according to claim 23, further comprising the step of
constructing the polyester film layer on the innermost side of the first material.

28. The method of packaging an air filter part according to claim 23, further comprising the step of
constructing the second material with a cardboard layer.

* * * * *